March 10, 1925.
C. O. WINGREN
SPHEROMETER OR MEASURING INSTRUMENT
Filed May 17, 1920
1,529,102
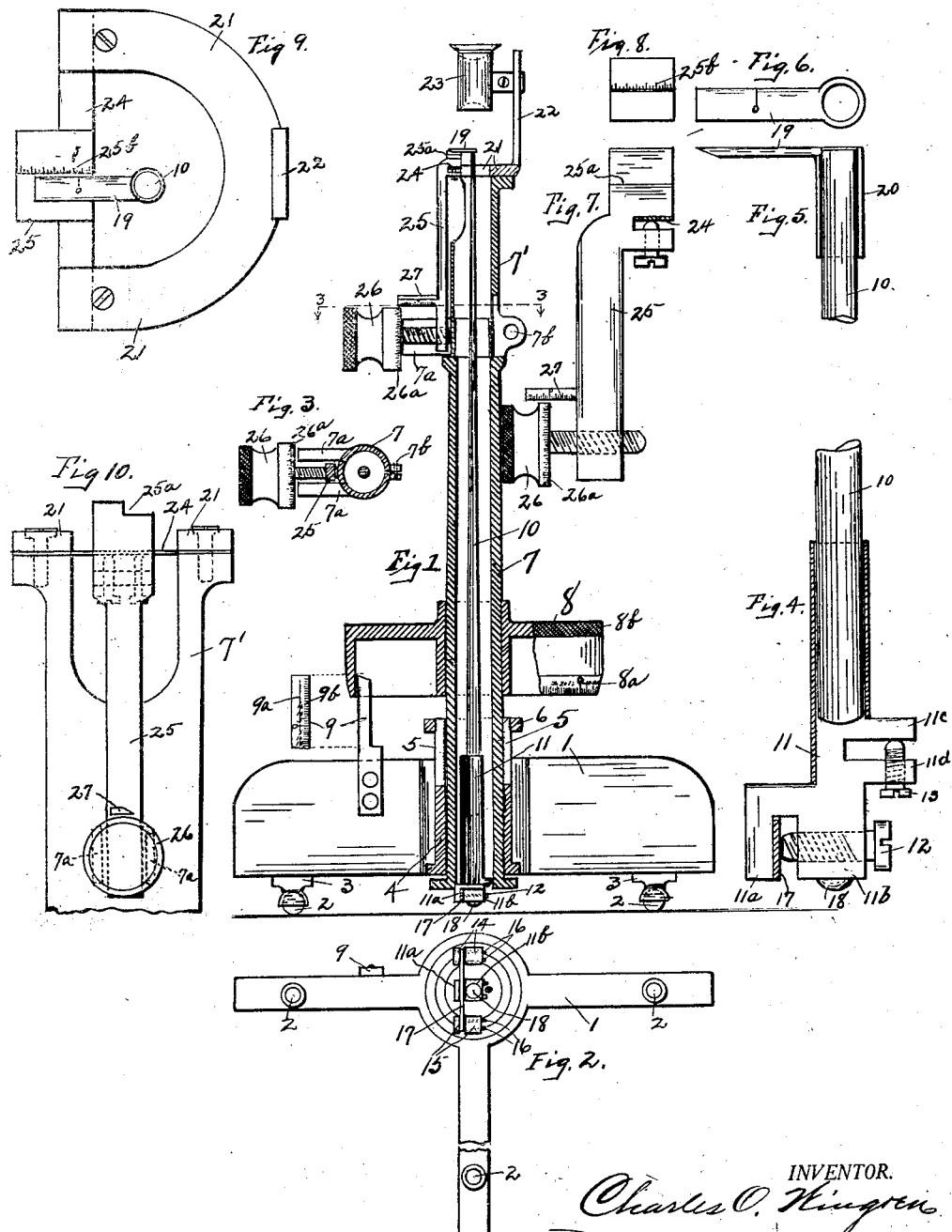
INVENTOR.
Charles O. Wingren
By
ATTORNEY.

Patented Mar. 10, 1925.

1,529,102

UNITED STATES PATENT OFFICE.

CHARLES O. WINGREN, OF PASADENA, CALIFORNIA.

SPHEROMETER OR MEASURING INSTRUMENT.

Application filed May 17, 1920. Serial No. 382,192.

*To all whom it may concern:*

Be it known that I, CHARLES O. WINGREN, a citizen of the United States, residing in the city of Pasadena, county of Los Angeles, and State of California, have invented certain new and useful Improvements in Spherometers or Measuring Instruments, of which the following is a specification.

Among the salient objects of my invention are, to provide in an instrument of the character referred to an indicator staff so supported vertically and so actuated that real precision is obtained therewith; to provide in connection therewith a plurality of adjustments which make possible and practical very accurate measurements and correct indications thereof; and to provide an instrument of the character referred to constructed along strictly scientific lines and which is simple, practical and precise to a degree.

In order to explain my invention, I have illustrated one practical embodiment thereof on the accompanying sheet of drawings, in which,—

Figure 1 is a vertical sectional view thereof;

Figure 2 is a bottom plan view thereon;

Figure 3 is a cross sectional view taken on line 3—3 of Fig. 1;

Figure 4 is an enlarged view of the lower end of the indicator staff and its supporting means;

Figure 5 is an enlarged view of the upper end of said staff;

Figure 6 is a top plan view of the upper end of the staff;

Figure 7 is an enlarged view of one of the adjustment members;

Figure 8 is a top plan view thereof;

Figure 9 is an enlarged top plan view of the supporting member for said adjustment member;

Figure 10 is an enlarged front elevation of the upper end of my instrument, as here shown, looking at the left-hand side of the upper end of Fig. 1.

Referring now in detail to the drawings, 1 designates a T-shaped base, or support, provided with three feet, each comprising a hard steel ball, 2, suitably set in a short leg member 3, as indicated, whereby said base or support stands firm and steady on three points of support in the same plane. The middle portion of said base is of cylindrical form and is provided therein with a micrometer nut, 4, split for a part of its length in a plurality of places, as at 5, and provided around its upper end with a threaded collar, 6, for taking up any looseness or wear between the micrometer nut, and a vertical tubular screw member 7, exteriorly threaded at its lower end with fine and accurately cut threads numbering forty threads to the inch, and turning in said micrometer nut, 4, for the purpose of raising and lowering said tubular screw member 7, through said base 1.

Secured to said tubular screw member 7, at the upper end of the threaded portion thereof, is a cylindrical member, 8, of sufficient diameter to provide for 250 division marks around its lower rim, $8^a$, its upper rim being nurled, as at $8^b$, to make it easy to turn it by hand for the purpose of turning said vertical screw member 7, in the micrometer nut 4.

An indicator bracket 9, is mounted on the base, and projects up into said cylindrical member 8, said bracket being provided with forty horizontal divisions to the inch, and standing parallel with said tubular member 7. Said bracket is also provided on its outer face with a vertical zero line, $9^a$, with which the vertical division marks $8^a$, around the lower rim of said cylindrical member 8 register. The lowermost edge of said cylindrical member 8, registers with the horizontal division marks $9^b$ on the face of said bracket, 9, as indicated. Said cylindrical member 8 also has a zero line in its divisions, around its lower rim, as at $8^a$, which is intended to be brought into register with the vertical zero line on the bracket 9, for a purpose hereinafter again referred to. Said bracket 9 preferably has numbers thereon, reading up from the horizontal zero line and also reading down therefrom, to indicate the number of turns of the tubular screw member 7. The divisions around the cylindrical member 8, are also numbered to show the fractional turns of the tubular member 7. Thus said tubular screw member 7 is adjustable up and down through the micrometer nut, 4, in the base 1, and its adjustments are accurately indicated on the bracket 9 and on the cylindrical member 8.

Said tubular screw member 7, is reduced at its upper end and is provided with an extension, 7', preferably arranged to be rotatably clamped around the upper end of the member 7, whereby it can be turned thereon to any desired position relative thereto and then secured in place by means of a clamp screw, through ears on the lower end thereof, as at 7ᵇ, said extension 7' being split between said ears, as indicated.

Vertically mounted within said tubular screw member 7, is an indicator staff, 10, the lower end of which is firmly held by friction or otherwise, in a holding member 11. The lower end of said holding member 11 is provided with spaced portions, 11ᵃ and 11ᵇ, with a set screw 12 through the portion 11ᵇ, for the purpose hereinafter referred to. Said member 11 may also be provided with two spaced, laterally projecting lug portions 11ᶜ and 11ᵈ, with a set screw, 13, therethrough, which may be used, if necessary, to spring the lug portions 11ᶜ and 11ᵈ for adjusting said indicator staff in order to get any very fine adjustment thereof. Referring to the lower end of the tubular screw member 7, Fig. 2, it is provided at opposite sides with two pairs of clamping lugs, 14 and 15, with screws 16, 16, for clamping therebetween a flat, supporting spring 17, which supports the indicator staff 10, by its holding member 11, said spring being positioned between the lug portions 11ᵃ and 11ᵇ, Fig. 4, and being secured thereto by the set screw 12, as clearly shown. The lower end of the indicator staff is thus so positioned in the middle of the flat torsion spring 17, as seen in Fig. 2, that the indicator staff has free movement with a slight flexing or twisting action of said flat spring 17. The lower end of the lug portion 11ᵇ is provided with a hard steel bearing or contact member, 18, in line with the two feet balls, 2, 2, at opposite sides thereof, and when said cylindrical member 8 is turned so that its zero line 8ᵃ registers with the vertical line on the bracket 9, and the lower edge of the cylindrical member 8, registers with the horizontal zero line on said bracket 9, said contact point 18, is in the same plane with said feet 2, 2, at opposite sides thereof.

The center of the contact member 18 is six-fiftieths (6/50) of an inch from the center line of the flat supporting spring, 17, and said contact member or point, 18, is located centrally of the tubular screw member 7. The indicator staff, from the contact point 18, to the upper end thereof, is six inches in length. The upper end thereof is provided with a horizontal indicator plate 19, secured thereto by means of a sleeve 20, said indicator plate 19 being provided with a zero mark, as indicated in Fig. 6. This plate is set at right angles to the torsion spring 17, which supports the indicator staff holder 11, at its lower end, so that the movement of the staff moves said indicator plate 19 longitudinally.

Secured to the upper end of the extension 7', in a horizontal plane, is a yoke or fork, 21, having a vertical extension, 22, for adjustably holding an eye glass 23, for reading the graduation marks, hereafter again referred to. Stretched across the ends of said yoke or fork, 21, and clamped, in a horizontal plane, between its ends and the upper ends of the extension 7'; as seen in Fig. 10, is a second flat, torsion, supporting spring, 24, as clearly indicated in Figs. 9 and 10, said spring 24 being parallel with the torsion spring 17, supporting the lower end of the staff holder 11. Clamped at its upper end to the middle of said horizontal torsion spring 24, is an adjustment lever, 25 (Figs. 7 and 10), the upper end of said lever having an angle 25ᵃ formed therein, with graduations 25ᵇ on the upper surface thereof, as indicated in Figs. 8 and 9, said marks being positioned adjacent and in substantially the same plane with the top surface of the indicator plate 19. The distance from the center of the flat horizontal torsion spring 24 to the flat face on top of said lever 25 and on which are the division marks 25ᵇ is one-eighth (⅛) of an inch, which brings the top of said member with its graduations in the same plane with said plate 19, as indicated in Fig. 9. Said division marks are placed four hundred divisions to the inch, parallel with the zero line on the indicator plate 19, on the upper end of the staff.

The lower end of said adjustment lever 25 is provided with a micrometer screw 26, having forty (40) threads to the inch, with a cylindrical portion of the head provided with fifty (50) divisions, as at 26ᵃ. The inner end of said screw 26 sets against the face of the tubular extension 7', between two side extensions, 7ᵃ, 7ᵃ, formed on the extensions 7', as shown in Fig. 3. A small extension, or finger, 27, projects from the side of said lever 25, adjacent the head or cylindrical portion of the micrometer screw 26, as shown in Figs. 1 and 10, and is provided with forty (40) divisions to the inch, which register with the division marks on said member, 26ᵃ. Thus when said micrometer screw 26 is turned, it will rock said adjustment lever 25, and thereby move its top surface on which are the indicating divisions, 25ᵇ.

As before stated, the tubular screw member 7, has forty threads per inch, and the cylindrical member has 250 divisions. When the cylindrical member and screw are turned one division, the contact point 18 on the bottom of the indicator staff 10, is moved by the movement of the tubular screw member 7, .0001 inch. The indicator staff being fifty times the distance from the contact point 18 to the center of the torsion supporting spring 17, the zero line on the plate 19 at the top of the staff 10, will be moved .005 inch. The upper end of the staff is positioned at a slight angle away from the divisions on the top of the lever 25, to enable one to see when contact is made and the zero line on the plate 19 registers with the zero line on divisions on top of the lever 25. Now the micrometer screw 26, at the lower end of the lever 25, has forty threads to the inch, and its circle has fifty divisions. When turned one division, registering with the edge of the projecting member 27, it rocks the lever 25 1/2000 of an inch, and the length of the lever being ten times greater than the fulcrum from the spring 24 to the 400 divisions per inch on top of lever 25, it follows that the divisions are moved 1/20,000 of an inch, which can be seen by the aid of the eye glass 23. The staff and contact point reduction being fifty times, it follows that 50×20,000 equal 1/1,000,000 of an inch on contact point.

Thus the greatest precision can be had in the measurements taken with my instrument, and while changes in details can be made from the showing herewith, I do not limit my invention to this showing, except as I may be limited by the hereto appended claims.

I claim:

1. An instrument of the character referred to comprising in combination a vertical member with supporting base having a plurality of surface engaging supports, a vertical indicator staff mounted at its lower end with its upper end free to move laterally and provided at its lower end, near its place of support, with a portion adapted to be adjusted to rest in the plane of the surface engaging supports, whereby when said portion is engaged the upper end of said staff is moved laterally, and means for determining the movement of said indicator staff relative to said vertical member.

2. In an instrument of the character referred to, a base, a flexible member supported by its ends thereon, a vertical indicator staff supported at its lower end upon said flexible member and a contact portion at the lower end of said staff near said flexible member port, whereby contact with said contact portion is indicated by the movement of the upper end of said staff.

3. In an instrument of the character referred to, a base, a flat spring member secured at its opposite ends thereto, a vertical indicator staff supported at its lower end upon said flat spring member, and a contact portion at the lower end of said staff, near its support, whereby contact therewith moves the upper end of said staff laterally.

4. In an instrument of the character referred to, a vertical indicator staff having a point of support at its lower end and a point of contact near said point of support, the distance between the point of support and the contact point having a predetermined ratio to the distance between the contact point and the upper end of said staff, and means at the upper end of said staff for indicating the movement thereof when contact is made with the contact point at its lower end.

5. In an instrument of the character referred to, a vertical indicator staff having a point of contact at its lower end, a flat spring member secured at its opposite ends and having secured thereto intermediate its ends, the lower end of said staff, said contact point being positioned relative to said flat spring member whereby contact therewith twists said flat spring between its ends, and indicating means at the upper end of said staff to determine the lateral movement thereof when contact is made with the contact point at its lower end, substantially as described.

6. In an instrument of the character referred to, a base, a vertical member thereon, a vertical indicator staff mounted adjacent said vertical member and supported at its lower end to permit its upper end to oscillate relative to said vertical member, a contact portion on said staff near its point of support and positioned relative thereto and to the upper end of said staff, whereby contact with said contact point causes a relative movement of the upper end of said staff, and means on the upper end of said vertical member, adjacent the upper end of said staff for indicating the movement thereof, for the purpose indicated.

7. In an instrument of the character referred to, a base, a vertical member theron, a flat spring member held by its opposite ends, a vertical indicator staff mounted adjacent said vertical member and supported at its lower end upon said flat spring member, said staff being secured thereto between said ends, a contact point at a predetermined distance from said point of support and from the upper end of said indicator staff, whereby contact with said contact point causes a relative movement laterally of the upper end of said indicator staff, and graduation means at the upper end of said vertical member, adjacent the upper end of said staff, for indicating the movement thereof.

8. In an instrument of the character referred to, a base, a tubular micrometer screw and nut vertically supported in said base, a vertical indicator staff in said tubular screw, a flexible supporting member secured at its opposite ends to the opposite sides of said tubular screw, at the lower end thereof, said staff being secured to said flexible member intermediate its secured ends, a contact portion at the lower end of said staff, laterally of said point of support, whereby contact therewith moves the upper end of said indicator staff laterally, and measuring means at the upper end of said staff for indicating the movements, substantially as described.

9. In an instrument of the character referred to, a base, a tubular micrometer screw and nut vertically supported in said base and adjustable vertically therethrough, means for turning the same, means for indicating the adjusted positions of said tubular micrometer screw in said base, a vertical staff in said tubular screw, a flat, horizontally positioned spring attached at its opposite ends to the opposite sides of said tubular screw, said staff being secured at its lower end in the middle portion of said spring, a contact point at the lower end of said staff, laterally of said supporting spring, said spring being arranged in a vertical plane, whereby movement of said contact point twists said spring to permit movement of the upper end of said staff laterally, and adjustable means provided with graduations adjacent the upper end of said vertical staff to indicate the movements thereof, substantially as described.

10. In an instrument of the character referred to, a base provided with spaced supporting feet occupying the same plane, a tubular micrometer screw mounted in said base and adjustable vertically therethrough, a vertical indicator staff in said tubular screw, a flat torsion spring secured at its opposite ends at the opposite sides of the lower end of said tubular screw, said spring occupying a vertical plane, a contact point at the lower end of said staff, at the side of said spring support, said contact point being in alinement with the supporting feet of said base and adjustable vertically relative to the plane of said supporting feet with said tubular micrometer screw, a lever supported at the upper end of said tubular screw, on a flat torsion spring occupying a horizontal plane, the upper end of said lever having graduation marks adjacent the upper end of said staff, said staff being provided with cooperating indicator element adjacent said graduation marks on said lever, and means for adjusting the lower end of said lever whereby to move said graduation marks relative to the upper end of said staff, substantially as shown and described.

11. In an instrument of the character referred to, a base provided with three points of support, occupying the same plane, a tubular member supported therein for vertical adjustment therethrough, means for indicating the various adjustments vertically of said tubular member, a vertical indicator staff in said tubular member, said staff being supported at its lower end in the lower end of said tubular member for permitting oscillating movement of the upper end of said staff, a point of contact at the lower end of said staff, near said point of support and in alinement with two of the supporting feet of said base, said point of contact being positioned a distance from said point of support having a ratio with the length of said staff, whereby movement vertically of said point of contact produces a relative lateral movement of the upper end of said staff, an adjustable member at the upper end of said tubular member, adjacent the upper end of said staff, and provided with graduations to be read in connection with the movements of the upper end of said staff, means for adjusting said adjustable member and its graduations relative to said staff, and an eye glass for reading the indications.

12. A spherometer comprising a base having spaced supporting feet in the same plane, a tubular micrometer screw therein and adjustable vertically therethrough, a graduated member for turning said screw, means on said base cooperating with said graduated member for indicating the various positions of adjustment of said micrometer screw, an indicator staff in said tubular screw and supported on a flat torsion spring stretched across the lower end of said tubular screw in a vertical plane, a contact point at the lower end of said staff at the side of said flat torsion spring, whereby contact with said contact point moves the upper end of said staff, an indicator plate on the upper end of said staff, an adjustable member supported on a flat torsion spring occupying a horizontal plane, at the upper end of said tubular screw, said member being provided with graduations adjacent the indicator plate on said staff, and a micrometer screw for adjusting the adjustable member to move its graduations relative to said staff indicator plate, whereby the finest possible adjustments can be made, substantially as described.

13. Means for supporting a vertical indicator staff comprising in combination therewith, a flexible member supported at its opposite ends, the lower end of said staff being secured to said flexible member between its end supports, whereby when said staff is moved laterally at its upper end said flexible member yields torsionally between its supports, and means at the lower end of said staff adjacent said flexible member for contact whereby to cause lateral movement of the upper end of said indicator staff.

14. In combination with a vertical indicator staff, a flat flexible member supported at its opposite ends and to which the lower end of said indicator staff is attached and by which said staff is supported with its upper end free and movable laterally by the flexing torsionally of said flexible member, indicating means cooperating with the movable end of the staff, a contact part at the lower end of said staff adjacent said flexible member adapted when engaged and moved in the slightest degree to move the upper end of said staff by the slight flexing of said flexible supporting member, and a support having a plurality of surface engaging parts spaced from the contact part of said staff.

15. In combination, a support having a plurality of surface engaging parts, a member adjustably mounted in said support, a flexible member secured at both ends across said adjustable member, a staff secured at its lower end to said flexible member between its ends with its upper end free and movable laterally, and a contact part at the lower end of said staff adjacent said flexible member and adapted when engaged to move the upper end of said staff laterally, and scale means associated with the upper end of said staff to indicate the relative movement thereof.

Signed at Pasadena, Los Angeles county, California, this 11th day of May, 1920.

CHARLES O. WINGREN.

In presence of:
W. R. LITZENBERG,
B. C. STRANG.